United States Patent
Park et al.

(10) Patent No.: US 9,032,330 B2
(45) Date of Patent: May 12, 2015

(54) DISPLAY APPARATUS AND USER INTERFACE DISPLAY METHOD THEREOF

(75) Inventors: Mi-ju Park, Seoul (KR); Sang-hee Lee, Seoul (KR); Yong-hwan Kwon, Seongnam-si (KR); Jeong-yeon Lee, Seongnam-si (KR); Won-il Kim, Gwacheon-si (KR); Woo-seok Hwang, Seoul (KR); Yeo-ri Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 999 days.

(21) Appl. No.: 12/501,134

(22) Filed: Jul. 10, 2009

(65) Prior Publication Data

US 2010/0095227 A1    Apr. 15, 2010

(30) Foreign Application Priority Data

Oct. 14, 2008    (KR) .................. 10-2008-0100590

(51) Int. Cl.
  *G06F 3/048*    (2013.01)
  *G06F 3/0482*    (2013.01)
(52) U.S. Cl.
  CPC .................... *G06F 3/0482* (2013.01)
(58) Field of Classification Search
  CPC ..... G06F 3/0481; G06F 3/0482; G06F 21/31; G09G 5/14; H04M 1/72583
  USPC .................. 715/810, 811, 825, 841
  See application file for complete search history.

(56) References Cited

U.S. PATENT DOCUMENTS

| | | | | |
|---|---|---|---|---|
| 6,829,009 B2 * | 12/2004 | Sugimoto | ...................... | 715/811 |
| 6,900,835 B2 * | 5/2005 | Cazier et al. | ................ | 348/231.2 |
| 7,240,296 B1 * | 7/2007 | Matthews et al. | ............. | 715/840 |
| 7,343,567 B2 * | 3/2008 | Mann et al. | .................... | 715/826 |
| 8,832,597 B2 * | 9/2014 | Kurtenbach | .................. | 715/834 |
| 8,881,060 B2 * | 11/2014 | Chaudhri et al. | ............. | 715/835 |
| 2004/0212640 A1 | 10/2004 | Mann et al. | | |
| 2007/0028287 A1 * | 2/2007 | Yamamoto et al. | ........... | 725/135 |
| 2007/0118813 A1 * | 5/2007 | Forstall et al. | ................ | 715/805 |
| 2007/0220441 A1 * | 9/2007 | Melton et al. | ................. | 715/781 |
| 2007/0256027 A1 * | 11/2007 | Daude | ........................... | 715/810 |

(Continued)

FOREIGN PATENT DOCUMENTS

| | | |
|---|---|---|
| EP | 1107097 A1 | 6/2001 |
| KR | 1020020015753 A | 3/2002 |

(Continued)

OTHER PUBLICATIONS

Communication dated Jul. 26, 2012 issued by the European Patent Office in counterpart European Patent Application No. 09166052.2.
Communication dated Jul. 16, 2014 issued by Korean Patent Office in counterpart Korean application No. 10-2008-0100590.

*Primary Examiner* — Dino Kujundzic
(74) *Attorney, Agent, or Firm* — Sughrue Mion, PLLC (57) ABSTRACT

A display apparatus and a user interface display method of the display apparatus are provided. The display apparatus classifies menu items of a service menu or an OSD menu according to the frequency of use of the menu items, generates icons corresponding to the classified menu items, and displays the icons on a screen using a user interface. Accordingly, the user can display a user interface on the screen in a preferable manner, and easily find and utilize a desired menu item.

21 Claims, 6 Drawing Sheets

(56) References Cited

U.S. PATENT DOCUMENTS

2008/0120324 A1 5/2008 Davis
2009/0217198 A1* 8/2009 Jung .......................... 715/802
2010/0070923 A1* 3/2010 Chuang et al. ............. 715/825

FOREIGN PATENT DOCUMENTS

| KR | 1020040083797 A | 10/2004 |
| KR | 1020080077798 A | 8/2008 |

* cited by examiner

DISPLAY APPARATUS AND USER INTERFACE DISPLAY METHOD THEREOF

CROSS-REFERENCE TO RELATED APPLICATIONS

This application claims priority from Korean Patent Application No. 10-2008-0100590, filed on Oct. 14, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus and a user interface display method, and more particularly, to a display apparatus which displays a menu using widgets, and a user interface display method.

2. Description of the Related Art

Recently, users have become able to access the Internet using display apparatuses such as televisions or mobile phones, and have access to a wide variety of services from content providers. However, a user may be confused when supplied with too many services. Therefore, there is a need for a user interface that enables the user to access desired services more easily.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

One or more exemplary embodiments of the present invention provide a display apparatus which facilitates the user's access to diverse services.

According to an exemplary embodiment of the present invention, there is provided a user interface display method of a display apparatus, the method including checking frequency of use of menu items in a menu, classifying the menu items according to the frequency of use of the menu items, and generating icons corresponding to the classified menu items, and displaying the icons on a screen.

In generating the icons corresponding to the classified menu items, a representative icon for at least one infrequently used menu item may be generated according to a preset reference.

At least one representative icon may be generated according to the frequency of use of the menu items.

The frequency of use of the menu items may be one of the total frequency of use of the menu items or the recent frequency of use of the menu items.

In generating the icons corresponding to the classified menu items, the icons corresponding to the classified menu items may be generated by classifying the menu items according to category or user.

In generating the icons corresponding to the classified menu items, an icon for each frequently used menu item may be generated according to a preset reference.

An icon corresponding to each menu item may be generated to sequentially show information regarding the menu item as a slideshow.

The menu may be at least one of a menu for setting the function of the display apparatus and a service menu for obtaining diverse information through the Internet.

In generating the icons corresponding to the classified menu items, the icons may be generated in a widget form.

According to another exemplary embodiment of the present invention, there is provided a display apparatus including a user interface (UI) generation unit which generates an icon, a display unit which displays the icon, and a control unit which checks frequency of use of menu items in a menu, classifies the menu items according to the frequency of use of the menu items, and controls the UI generation unit to generate icons corresponding to the classified menu items.

The UI generation unit may generate a representative icon for at least one infrequently used menu item according to a preset reference.

At least one representative icon may be generated according to the frequency of use of the menu items.

The frequency of use of the menu items may be one of the total frequency of use of the menu items or the recent frequency of use of the menu items.

The UI generation unit may generate the icons corresponding to the classified menu items by classifying the menu items according to the category or user.

The UI generation unit may generate an icon for each frequently used menu item according to a preset reference.

An icon corresponding to each menu item may be generated to sequentially show information regarding the menu item as a slideshow.

The menu may be at least one of a menu for setting the function of the display apparatus and a service menu for obtaining diverse information through the Internet.

The UI generation unit may generate the icons in a widget form.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, like drawing reference numerals are used for like elements, even in different drawings. The matters defined in the description, such as the detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 1:
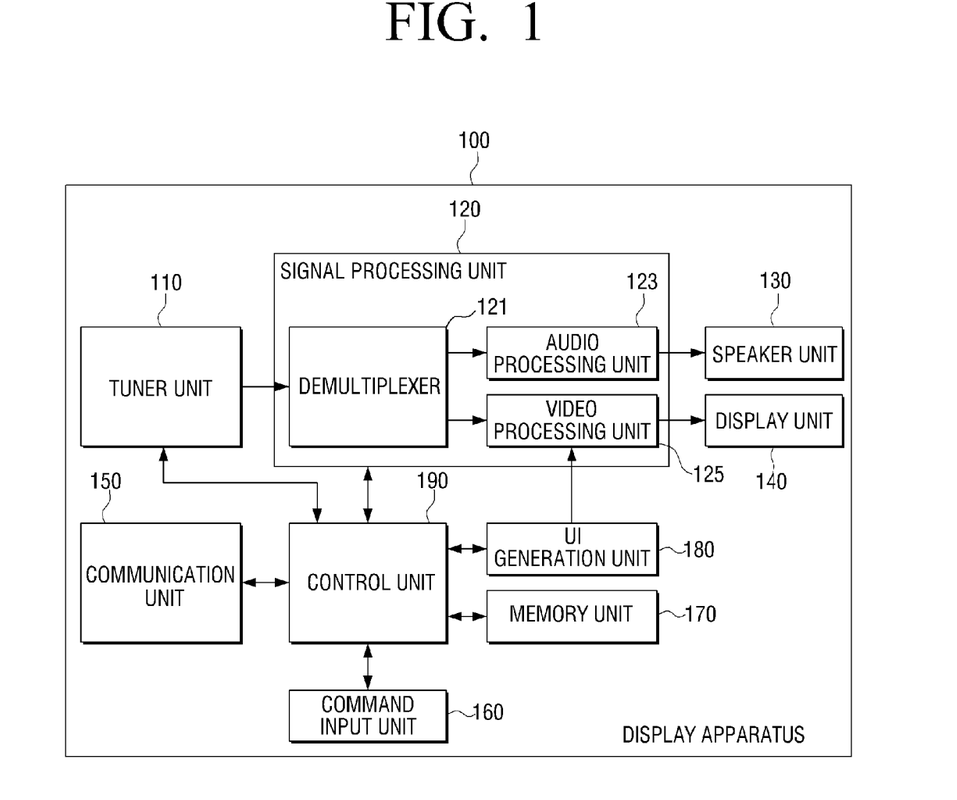
FIG. 1 is a schematic block diagram of a display apparatus according to an exemplary embodiment of the present invention.

FIG. 1 is a schematic block diagram of a display apparatus according to an exemplary embodiment of the present invention.

Referring to FIG. 1, the display apparatus 100 may include a tuner unit 110, a signal processing unit 120, a speaker unit 130, a display unit 140, a communication unit 150, a command input unit 160, a memory unit 170, a user interface (UI) generation unit 180, and a control unit 190.

The tuner unit 110 tunes to a broadcast signal having a frequency band corresponding to a channel selected by control of the control unit 190, demodulates the tuned broadcast signal, and corrects errors in the tuned broadcast signal, so that the broadcast signal can be output in a transport stream (TS) format.

The signal processing unit 120 may include a demultiplexer 121, an audio processing unit 123, and a video processing unit 125.

The demultiplexer 121 divides the broadcast signal demodulated by the tuner unit 110 into video data, audio data, and additional data defined as Program and System Information Protocol (PSIP), and outputs such data in a bit stream format.

The audio processing unit 123 decodes the audio data output by the demultiplexer 121 and processes the decoded audio data to be suitable for the output standard of the speaker unit 130.

The video processing unit 125 decodes the video data output by the demultiplexer 121 and processes the decoded video data to have a vertical frequency, resolution, and ratio aspect suitable for the output standard of the display unit 140. In addition, the video processing unit 125 scales a user interface generated by the UI generation unit 180 and the video data so as to display the user interface along with the video data on the display unit 140.

The speaker unit 130 amplifies the audio data output by the audio processing unit 123 to a certain degree of sound and outputs the amplified audio data.

The display unit 140 displays the video data and user interface output by the video processing unit 125.

The communication unit 150 communicates with a broadcasting server or a web server through the Internet so as to receive diverse services. That is, the communication unit 150 requests services desired by the user via the Internet, and receives services from an external source.

The command input unit 160 may include diverse keys to receive user commands, and an infrared signal receiving unit to receive user commands from a remote control (not shown). Alternatively, the command input unit 160 may be implemented as a touch panel in combination with the display unit 140. User commands received through the command input unit are converted into corresponding key signals, and transmitted to the control unit 190.

The memory unit 170 stores diverse programs and data needed for performing the operation of the display apparatus 100. In addition, the memory unit 170 stores information on the frequency of use of a service menu and the frequency of use of an on-screen display (OSD) menu needed for setting the function of the display apparatus 100.

The UI generation unit 180 generates a service menu for using services received through the communication unit 150. In addition, the UI generation unit 180 generates an OSD menu for the user to set the function of the display apparatus 100. The UI generation unit 180 generates icons in a widget form corresponding to a menu classified by the control unit 190 according to the frequency of use.

The control unit 190 controls each component to perform its function according to user commands received through the command input unit 160. That is, if a user command to request a specific service is received through the command input unit 160, the control unit 190 controls the communication unit 150 to request and receive the service through the Internet. Subsequently, the control unit 190 controls the signal processing unit 120 and the display unit 140 to process the received service and provide the user with the service.

In this case, the control unit 190 updates the information on the frequency of use of the service and stores the information on the frequency of use of the service in the memory unit 170. Subsequently, the control unit 190 classifies services according to their frequency of use, and controls the UI generation unit 180 to generate a user interface based on the classification result. That is, the control unit 190 classifies services according to their total frequency of use or their recent frequency of use, and controls the UI generation unit 180 to generate a user interface so that the user can utilize the classified services easily.

The service menu in the user interface generated by the UI generation unit 180 is a widget menu which is generated in a widget form.

Hereinbelow, exemplary embodiments of the user interface generated by the UI generation unit 180 are described.

FIGS. 2A to 2G illustrate various types of user interface which are displayed on a display apparatus according to exemplary embodiments of the present invention. Referring to FIGS. 2A to 2G, a main screen 200 displays a broadcast program, and a widget menu window 210 displays icons for services generated according to their frequency of use.

Figure 2A:
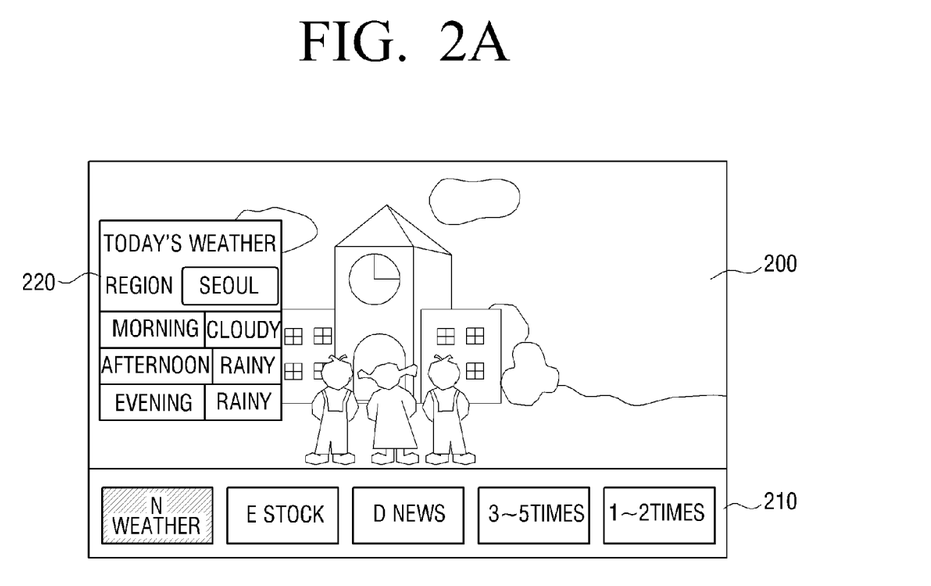
FIGS. 2A to 2G illustrate types of user interfaces which are displayed on a display apparatus, according to exemplary embodiments of the present invention.
Figure 2B:
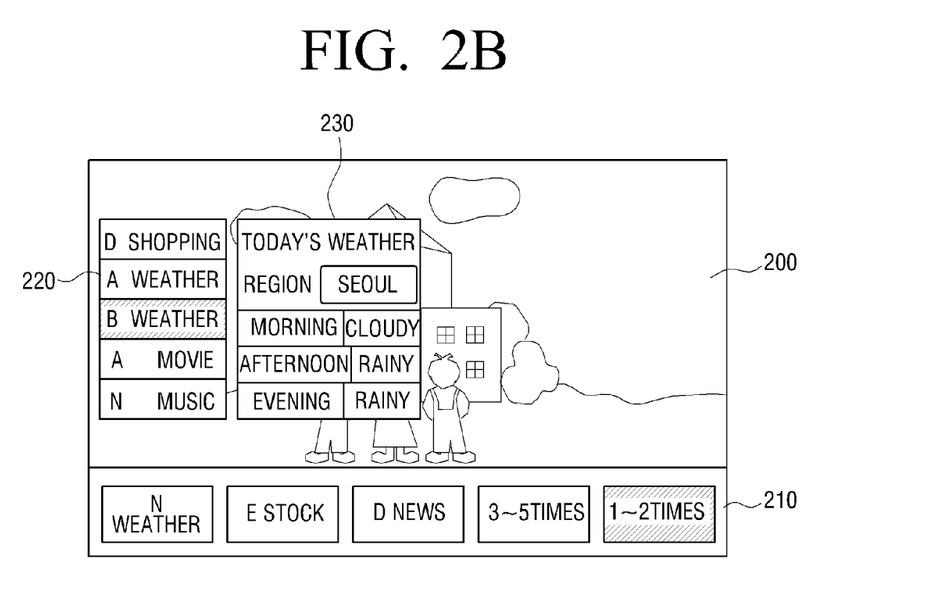

In the widget menu window 210 of FIGS. 2A and 2B, icons such as [N weather], [E stock], [D news], [3-5 times], and [1-2 times] are arranged according to their frequency of use. That is, the most frequently used service is a service regarding [N weather], followed by [E stock] and [D news]. If [N weather] is selected, a first sub window 220 displays information regarding [N weather] as illustrated in FIG. 2A.

Services which are not frequently used by the user are classified in [3-5 times] or [1-2 times]. That is, if [1-2 times] is selected, the first sub window 220 of FIG. 2B displays icons regarding services which have only been used once or twice by the user. Among the icons [D shopping], [A weather], [B weather], [A movie], and [N music] which are displayed on the first sub window 220, if the user selects [B weather], a second sub window 230 displays information regarding [B weather] as illustrated in FIG. 2B.

In FIGS. 2A and 2B, as an example, the three most frequently used icons are displayed on the widget menu window 210, and the remaining services are classified into other two icons according to their frequency of use. The number of frequently used icons which are arranged in the widget menu window 210 can be set by the user. In addition, the number and frequency of use of icons for infrequently used services, such as [3-5 times] and [1-2 times], can be set by the user. In other words, infrequently used services may be classified under [1-5 times] and [6-8 times] icons, or may be classified under [1-2 times], [3-4 times] and [5-6 times] icons.

As illustrated in FIGS. 2A and 2B, since infrequently used services are managed under one or more icons, infrequently used services as well as frequently used services can also be easily found. That is, icons of frequently used services are displayed on the widget menu window 210, and icons of infrequently used services are collected and displayed as lower menus under representative icons, so many icons for all of the services do not have to be displayed in the widget menu window 210. Therefore, the user can find an icon of a desired service easily.

Figure 2C:
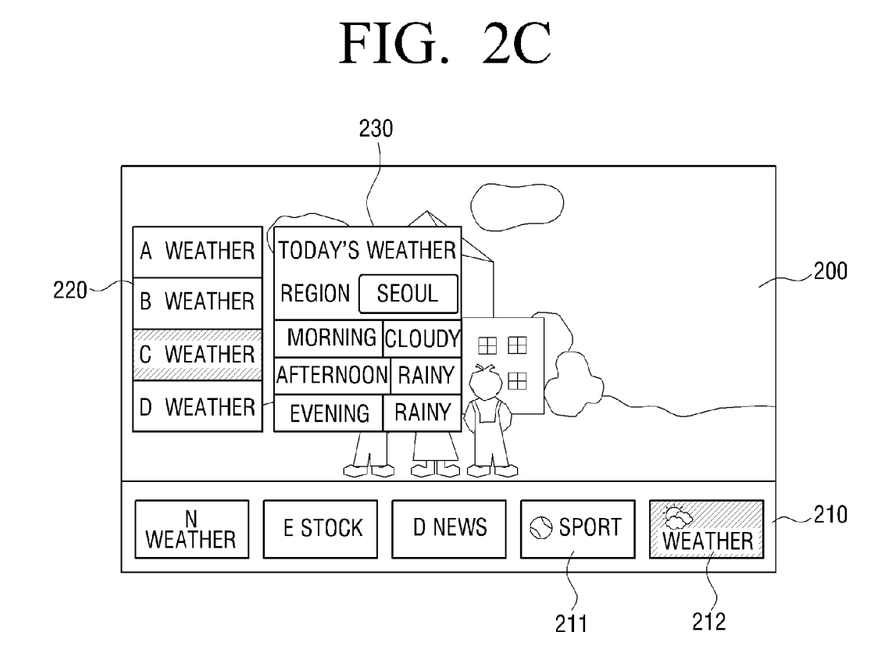

In a widget menu window 210 of FIG. 2C, icons of frequently used services such as [N weather], [E stock], and [D news] are displayed, and infrequently used services are classified under categories desired by the user, such as sport 211 and weather 212. If the user selects weather 212, a first sub window 220 displays icons regarding weather 212 as illustrated in FIG. 2C. Among [A weather], [B weather], [C weather], and [D weather] displayed in the first sub window 220, if the user selects [C weather], a second sub window 230 displays information regarding [C weather], as illustrated in FIG. 2C.

The categories can be modified by the user as desired, and the number of categories displayed in the widget menu window 210 can also be set by the user. That is, FIG. 2C illustrates two categories as an example, but it is possible to have only one category, or three or more categories.

Figure 2D:
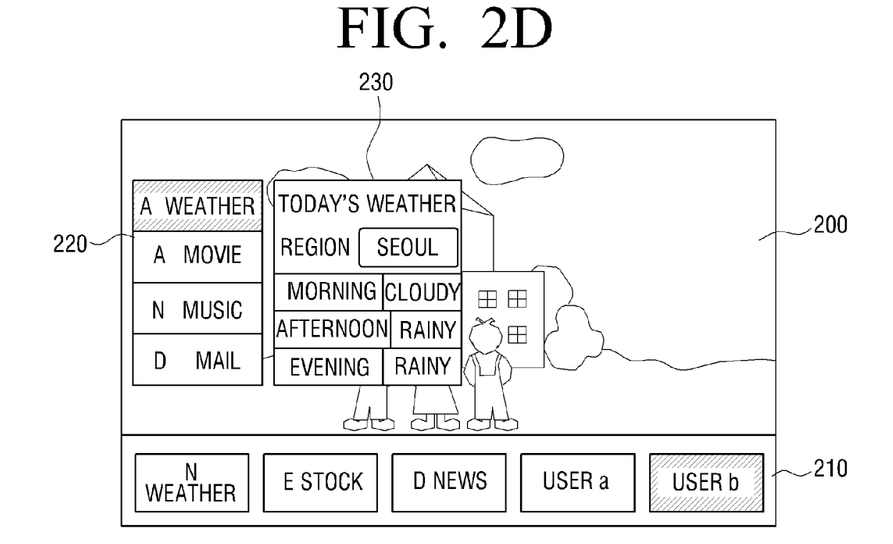

In a widget menu window 210 of FIG. 2D, icons of frequently used services such as [N weather], [E stock], and [D news] are displayed, and infrequently used services are classified according to the user. That is, infrequently used services are classified under icons [user a] and [user b], as illustrated in FIG. 2D. If [user b] is selected, a first sub window 220 displays icons of services used by user b as illustrated in FIG. 2D.

The icons displayed in the first sub window 220 are arranged according to their frequency of use by user b. Among [A weather], [A movie], [N music], and [D mail], which are displayed in the first sub window 220, if [A weather] is selected, a second sub window 230 displays information regarding [A weather] as illustrated in FIG. 2D. Users can be distinguished by allocating a user identification and a password to each user in order for each user to log-in to use the display apparatus 100. Other methods can also be used to distinguish users.

As illustrated in FIGS. 2C and 2D, infrequently used services are classified according to their category or user, so infrequently used services as well as frequently used services can be easily found.

Figure 2E:
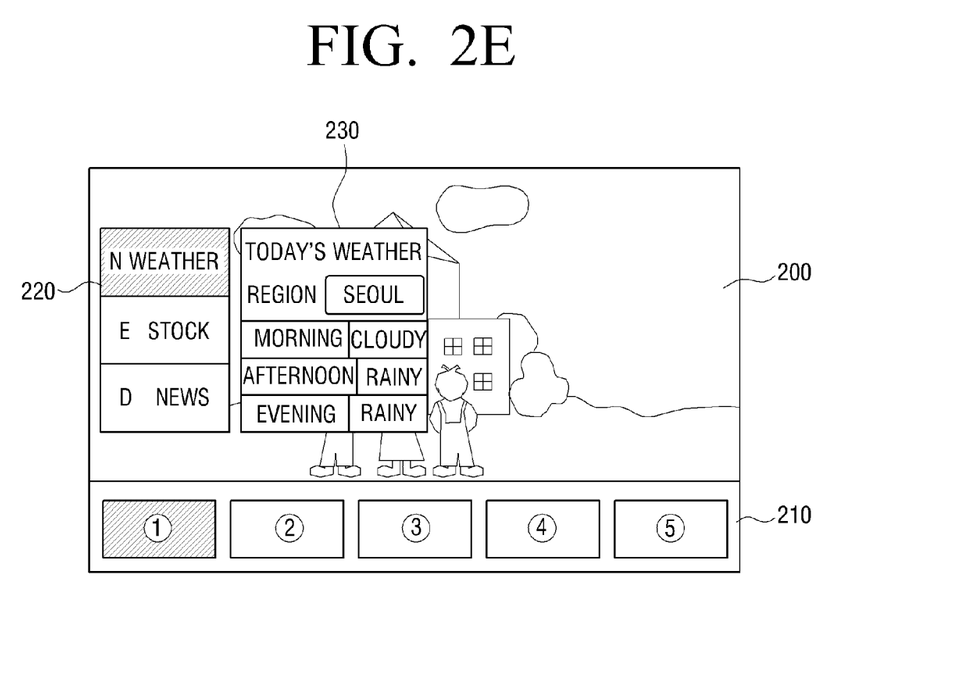

In a widget menu window 210 of FIG. 2E, a plurality of icons [①], [②], [③], [④], and [⑤] are displayed, and each icon includes services classified according their frequency of use. For example, services having a frequency of use of 50% or more are classified in a lower menu under [①], services having a frequency of use of 30%-50% are classified in a lower menu under [②], services having a frequency of use of 10%-30% are classified in a lower menu under [③], services having a frequency of use of 2%-10% are classified in a lower menu under [④], and services having a frequency of use of 0%-2% are classified in a lower menu under [⑤]. Alternatively, the number of services classified under each icon [①], [②], [③], [④], and [⑤] may be limited. That is, the three most frequently used services may be classified under [①], and services can be allocated to [②], [③], [④], and [⑤] in the same manner.

As illustrated in FIG. 2E, if the user selects [①], a first sub window 220 displays icons [N weather], [E stock], and [D news] which are classified under [①]. Among [N weather], [E stock], and [D news] which are displayed in the first sub window 220, if the user selects [N weather], a second sub window 230 displays information regarding [N weather], as illustrated in FIG. 2E.

Figure 2F:
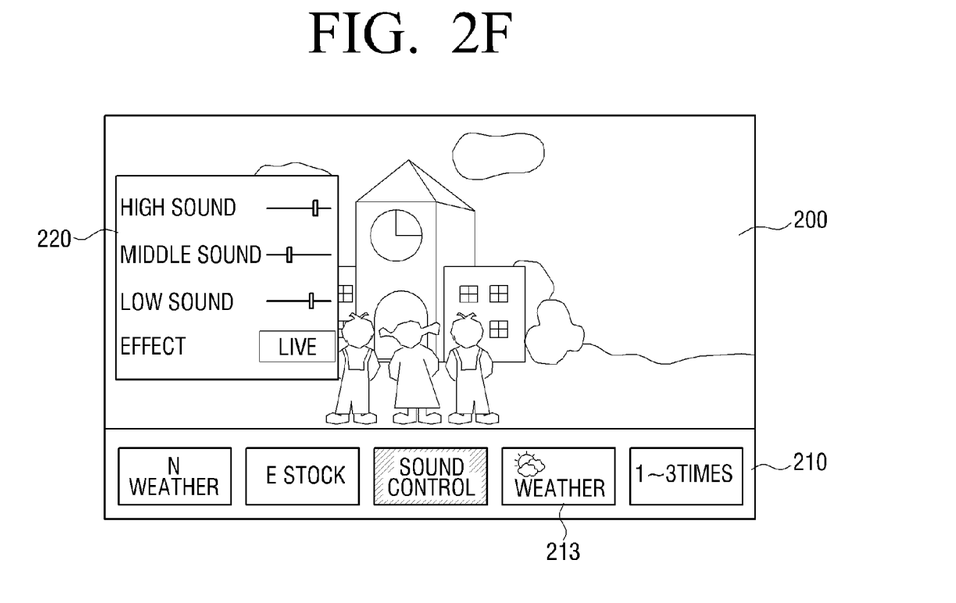

FIG. 2F illustrates that a widget menu window 210 displays an OSD menu for setting the function of the display apparatus 100 as an example. That is, the widget menu window 210 can display frequently used icons of the OSD menu as well as icons of frequently used services. As illustrated in FIG. 2F, if [sound control] is selected, a first sub window 220 displays an OSD menu for setting sound.

The widget menu window 210 of FIG. 2F may display [1-3 times] regarding the frequency of use as illustrated in FIGS. 2A and 2B, or display weather 213 regarding the category as illustrated in FIG. 2C. Although not illustrated in FIG. 2F, the widget menu window 210 may also display icons classified according to the user. As described above, the type of icons displayed on the widget menu window 210 can be set by the user, so the user can utilize the widget menu window 210 in diverse manners.

Figure 2G:
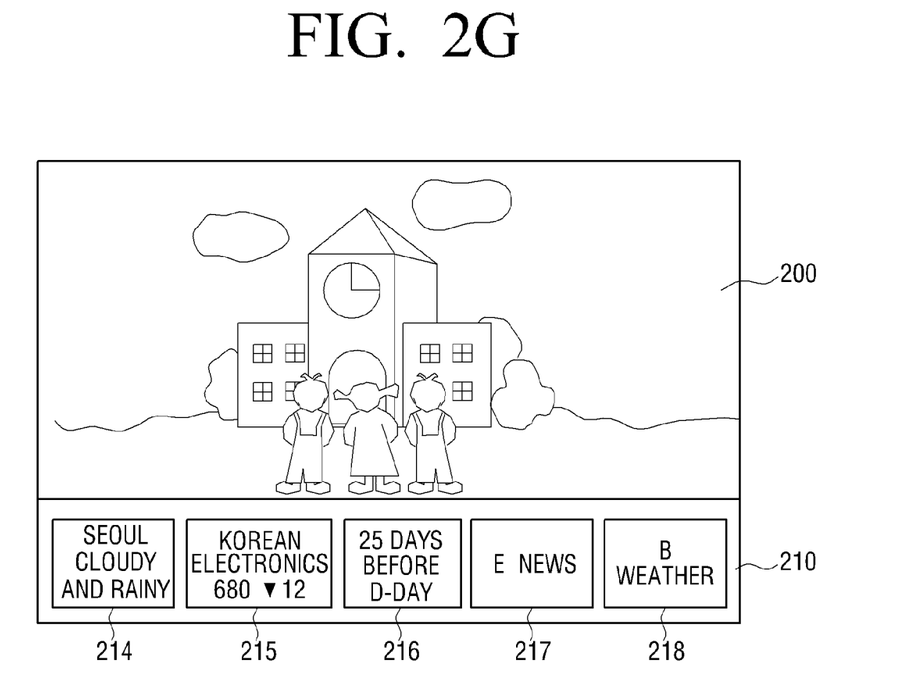

In a widget menu window 210 of FIG. 2G, a first icon 214, a second icon 215, a third icon 216, a fourth icon 217, and a fifth icon 218 are displayed. Information regarding each service is sequentially displayed on each icon as a slideshow. That is, as illustrated in FIG. 2G, information regarding the N weather service is displayed in the first icon 214 as a slideshow, information regarding the E stock service is displayed in the second icon 215 as a slideshow, and information regarding the D news service is displayed in the third icon 216 as a slideshow.

The fourth icon 217 and the fifth icon 218 display infrequently used services as slide shows. For example, if the fourth icon 217 includes services used by user a as a lower menu, the fourth icon 217 sequentially displays icons corresponding to services used by user a as a slideshow. As another example, if the fifth icon 218 indicates a category regarding weather, the fifth icon 218 sequentially displays icons corresponding to services classified under weather as a slideshow.

Various user interface display methods as described above can be set by the user, and the user can easily select a desired service through a menu arranged according to the frequency of use.

Figure 3:
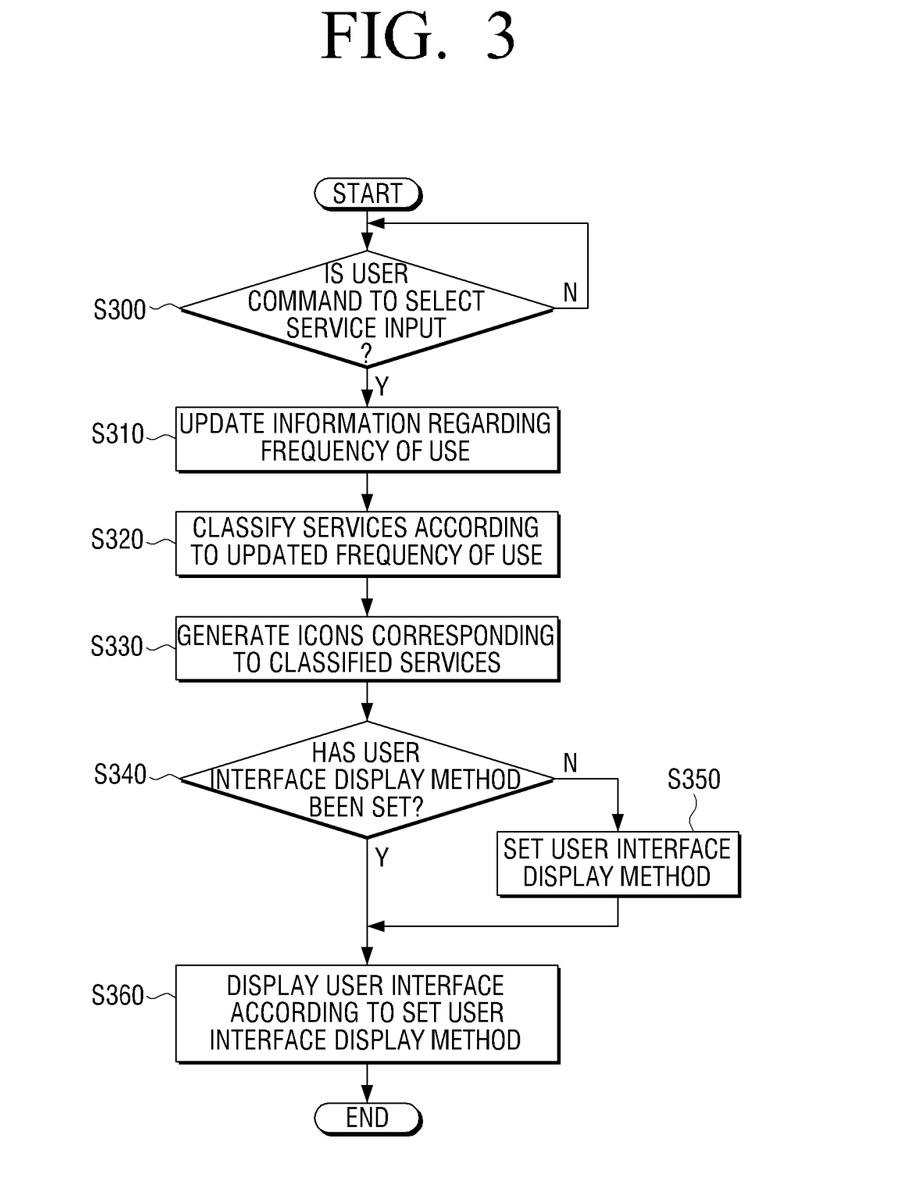
FIG. 3 is a flowchart illustrating a method for displaying a user interface on a display apparatus according to an exemplary embodiment of the present invention.

FIG. 3 is a flowchart illustrating a method for displaying a user interface on a display apparatus according to an exemplary embodiment of the present invention.

Referring to FIG. 3, if a user command to select a specific service is input to the display apparatus 100 (S300), the control unit 190 updates information regarding the frequency of use (S310). That is, the control unit 190 checks the frequency of use of the selected service, and stores the checked frequency of use in the memory unit 170. Subsequently, the control unit 190 classifies the services according to the updated frequency of use (S320), and controls the UI generation unit 180 to generate icons corresponding to the classified services (S330).

If a user interface display method has been set (S340-Y), the control unit 190 controls the UI generation unit 180, the video processing unit 125, and the display unit 140 to display a user interface according to the set user interface display method (S360). If a user interface display method has not already been set (S340-N), a user interface display method is set (S350), and the control unit 190 displays a user interface according to the set user interface display method (S360).

As can be appreciated from the above description, the user can easily utilize a desired service using icons generated according to the frequency of use of the service by directly setting a user interface display method.

According to exemplary embodiments of the present invention, the user can easily select a desired service by displaying icons according to the frequency of use.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A user interface display method for providing a plurality of service items, the method comprising:
   analyzing a frequency of use of the plurality of service items; and
   determining where a plurality of user interface elements corresponding to the plurality of service items are to be displayed based on the frequency of use of the plurality of service items,
   wherein the determining where the plurality of service items are to be displayed comprises displaying a first user interface element from among the plurality of user interface elements as an individual user interface element when the frequency of use of a first service item corresponding to the first user interface element is greater than a pre-set frequency of use, and displaying a second user interface element from among the plurality of user interface elements as a sub-user interface element of a representative user interface element when the frequency of use of a second service item corresponding to the second user interface element is less than the pre-set frequency of use, and
   wherein in response to a command of selecting the individual user interface element, the first service item corresponding to the selected individual user interface element is displayed, and in response to a command of selecting the representative user interface element, the sub-user interface element which belongs to the selected representative user interface element is displayed.

2. The user interface display method according to claim 1, wherein the frequency of use of the plurality of service items is one of a total frequency of use of the plurality of service items and a recent frequency of use of the plurality of service items.

3. The user interface display method according to claim 1, wherein the representative user interface element is classified according to categories or users.

4. The user interface display method according to claim 1, wherein the second user interface element sequentially shows information regarding a respective menu item as a slideshow.

5. The user interface display method according to claim 1, wherein the plurality of service items comprise at least one of a service item for setting a function of the display apparatus and a service menu item for obtaining information through the Internet.

6. The user interface display method according to claim 1, wherein the individual user interface element and the representative user interface element are generated in widget form.

7. The user interface display method according to claim 1, wherein in response to N menu items being set to be displayed on a predetermined region of the screen of the display apparatus, N−1 individual user interface elements are displayed and 1 representative menu user interface element is displayed on the predetermined region of the display apparatus.

8. A display apparatus comprising:
   a user interface (UI) generation unit which generates a plurality of service items;
   a display unit which displays the plurality of service items on a screen of the display apparatus; and
   a control unit which analyzes a frequency of use of the plurality of service items, determines where a plurality of user interface elements corresponding to the plurality of service items are to be displayed based on the frequency of use of the plurality of service items,
   wherein the control unit controls to display a first user interface element from among the plurality of user interface elements as an individual user interface element when the frequency of use of a first service item corresponding to the first user interface element is greater than a pre-set frequency of use, and display a second user interface element from among the plurality of user interface elements as a sub-user interface element of a representative user interface element when the frequency of use of a second service item corresponding to the second user interface element is less than the pre-set frequency of use,
   wherein in response to a command of selecting the individual user interface element, the control unit controls to display the first service item corresponding to the selected individual user interface element, and in response to a command of selecting the representative user interface element, the control unit controls to display the sub-user interface element which belongs to the selected representative user interface element.

9. The display apparatus according to claim 8, wherein the frequency of use of the plurality of service items is one of a total frequency of use of the plurality of service items and a recent frequency of use of the plurality of service items.

10. The display apparatus according to claim 9, wherein the representative user interface element is classified according to categories or users.

11. The display apparatus according to claim 9, wherein the plurality of service items comprise at least one of a service item for setting a function of the display apparatus and a service menu item for obtaining information through the Internet.

12. The display apparatus according to claim 9, wherein the UI generation unit generates the plurality of service items in widget form.

13. The display apparatus according to claim 8, wherein the second user interface element sequentially shows information regarding a respective menu item as a slideshow.

14. The display apparatus according to claim 8, wherein the individual user interface element comprises a first icon and the representative user interface element comprises a second icon.

15. A method for providing a plurality of service items, the method comprising:
   receiving a user input regarding at least one service item from among a plurality of a service items;
   analyzing a frequency of use of the plurality of service items based on the user input; and
   determining where a plurality of user interface elements corresponding to the plurality of service items are to be displayed based on the frequency of use of the plurality of service items,
   wherein the determining where the plurality of service items are to be displayed comprises displaying a first user interface element from among the plurality of user interface elements as an individual user interface element when the frequency of use of a first service item corresponding to the first user interface element is greater than a pre-set frequency of use, and displaying a second user interface element from among the plurality of user interface elements as a sub-user interface element of a representative user interface element when the frequency of use of a second service item corresponding to the second user interface element is less than the pre-set frequency of use, and
   wherein in response to a command of selecting the individual user interface element, the first service item corresponding to the selected individual user interface element is displayed, and in response to a command of selecting the representative user interface element, the sub-user interface element which belongs to the selected representative user interface element is displayed.

16. The method of claim 15, wherein the plurality of service items are generated in widget form.

17. The method of claim 15, wherein a number of the representative user interface elements and the pre-set frequency of use can be set by the user.

18. The method of claim 17, wherein a plurality of service items corresponding to the representative user interface element are classified according categories set by the user.

19. The method of claim 17, wherein a plurality of service items corresponding to the representative user interface element are classified according to the user which uses the service.

20. The user interface display method according to claim 1, wherein the individual user interface element comprises a first icon and the representative user interface element comprises a second icon.

21. The method of claim 15, wherein the individual user interface element comprises a first icon and the representative user interface element comprises a second icon.

* * * * *